United States Patent
Noh et al.

(10) Patent No.: US 9,239,096 B2
(45) Date of Patent: Jan. 19, 2016

(54) PLANETARY GEAR TRAIN OF AUTOMATIC TRANSMISSION FOR VEHICLE

(71) Applicant: Hyundai Motor Company, Seoul (KR)

(72) Inventors: Myeong Hoon Noh, Whasung-Si (KR); Seong Wook Hwang, Whasung-Si (KR); Young Ji Park, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/502,526

(22) Filed: Sep. 30, 2014

(65) Prior Publication Data

US 2015/0167790 A1 Jun. 18, 2015

(30) Foreign Application Priority Data

Dec. 18, 2013 (KR) .................. 10-2013-0158809

(51) Int. Cl.
*F16H 3/62* (2006.01)
(52) U.S. Cl.
CPC .......... *F16H 3/62* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 7,674,200 B2* | 3/2010 | Shim | 475/281 |
| 7,699,741 B2* | 4/2010 | Hart et al. | 475/271 |
| 7,909,726 B2* | 3/2011 | Phillips et al. | 475/282 |
| 8,202,190 B2* | 6/2012 | Phillips et al. | 475/275 |
| 8,246,504 B2* | 8/2012 | Gumpoltsberger et al. | 475/286 |
| 8,529,395 B2* | 9/2013 | Wittkopp et al. | 475/280 |
| 8,556,765 B2* | 10/2013 | Bockenstette et al. | 475/275 |
| 8,678,972 B2* | 3/2014 | Wittkopp et al. | 475/275 |
| 8,777,797 B2* | 7/2014 | Mellet et al. | 475/275 |
| 8,795,128 B2* | 8/2014 | Mellet et al. | 475/276 |
| 8,888,648 B2* | 11/2014 | Mellet et al. | 475/275 |
| 8,926,469 B2* | 1/2015 | Hart et al. | 475/276 |

* cited by examiner

*Primary Examiner* — Dirk Wright
(74) *Attorney, Agent, or Firm* — Morgan, Lewis & Bockius LLP

(57) ABSTRACT

A planetary gear train of an automatic transmission for a vehicle may include an input shaft configured to receive torque of an engine, an output shaft outputting changed torque, a first planetary gear set having a first sun gear, a first planet carrier, and a first ring gear as rotation elements thereof, a second planetary gear set having a second sun gear, a second planet carrier, and a second ring gear as rotation elements thereof, a third planetary gear set having a third sun gear, a third planet carrier, and a third ring gear as rotation elements thereof, and a fourth planetary gear set having a fourth sun gear, a fourth planet carrier, and a fourth ring gear as rotation elements thereof.

11 Claims, 13 Drawing Sheets

FIG. 2

|  | C1 | C2 | C3 | C4 | B1 | B2 | Gear ratio |
|---|---|---|---|---|---|---|---|
| 1ST |  |  | ● | ● |  | ● | 4.462 |
| 2ND | ● |  | ● |  |  | ● | 2.700 |
| 3RD |  | ● | ● |  |  | ● | 1.862 |
| 4TH | ● | ● |  |  |  | ● | 1.370 |
| 5TH | ● | ● |  | ● |  |  | 1.000 |
| 6TH |  | ● |  | ● | ● |  | 0.862 |
| 7TH | ● |  |  | ● | ● |  | 0.652 |
| 8TH |  |  | ● | ● | ● |  | 0.603 |
| 9TH | ● |  | ● |  | ● |  | 0.571 |
| 10TH |  | ● | ● |  | ● |  | 0.493 |
| Rev | ● |  |  | ● |  | ● | -2.587 |

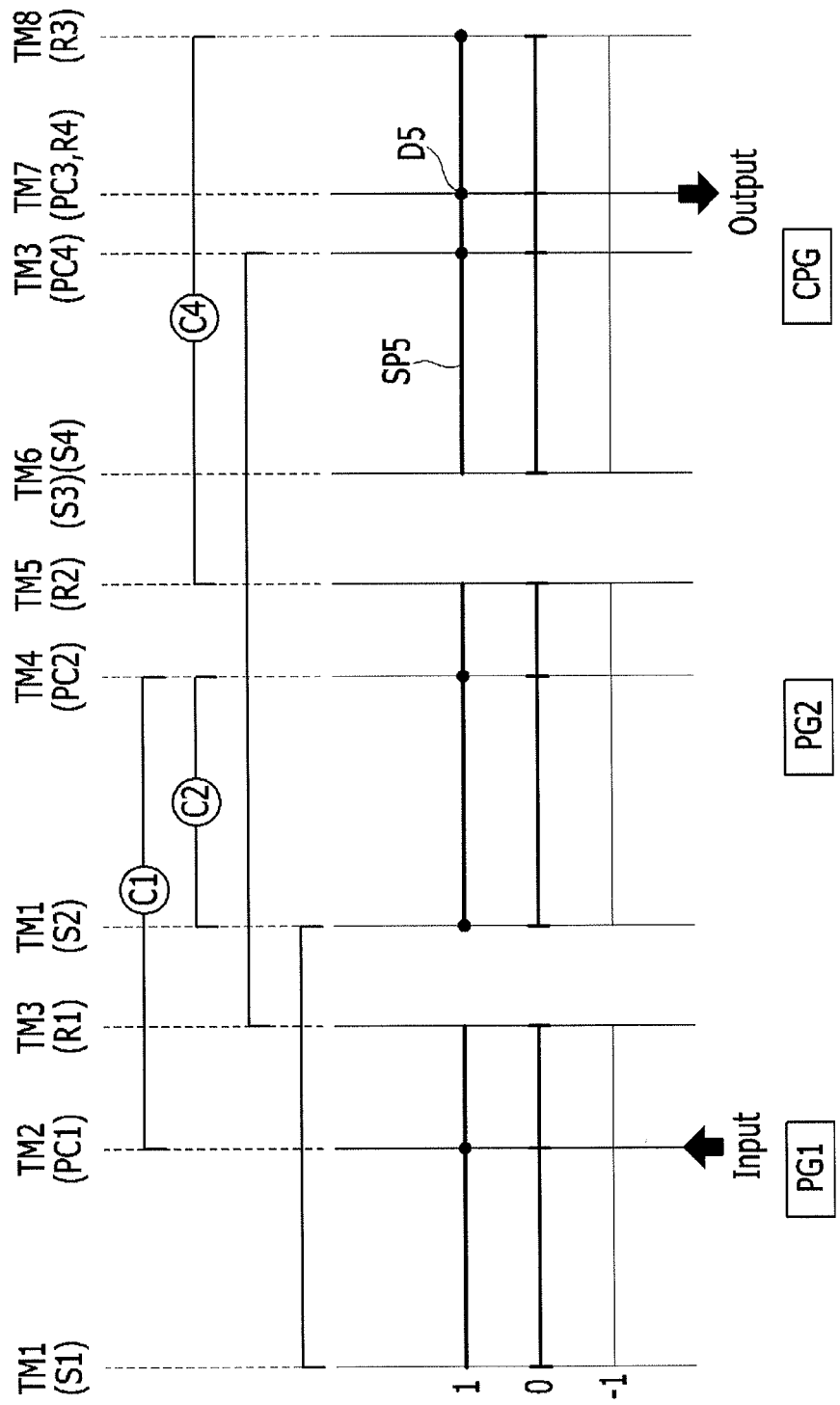

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2013-0158809 filed on Dec. 18, 2013, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle which can improve power delivery performance and fuel economy.

2. Description of Related Art

Recently, rise of oil price accelerates enhancement of fuel economy.

Therefore, weight reduction and enhancement of fuel economy through downsizing have been developed in an engine field, and securing drivability and fuel economy through achieving multiple shift-speeds have been developed in an automatic transmission field.

However, if the number of shift-speeds in the automatic transmission increases, mountability, cost, weight and power delivery efficiency may be deteriorated due to increase of the number of components.

Therefore, it is very important to develop a planetary gear train having smaller number of components and securing better performance in order to enhance fuel economy through achieving multiple shift-speeds.

Currently, eight-speed and nine-speed automatic transmissions are found on the market. However, automatic transmissions achieving ten or more shift-speeds have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of achieving ten forward speeds and one reverse speed by combining a plurality of planetary gear sets and a plurality of friction elements, and improving power delivery performance and fuel economy by operating three friction members and minimum number of planetary gear sets at each speed.

A planetary gear train of an automatic transmission for a vehicle according to an exemplary embodiment of the present invention may include: an input shaft configured to receive torque of an engine; an output shaft outputting changed torque; a first planetary gear set having a first sun gear, a first planet carrier, and a first ring gear as rotation elements thereof; a second planetary gear set having a second sun gear, a second planet carrier, and a second ring gear as rotation elements thereof; a third planetary gear set having a third sun gear, a third planet carrier, and a third ring gear as rotation elements thereof; a fourth planetary gear set having a fourth sun gear, a fourth planet carrier, and a fourth ring gear as rotation elements thereof; a first rotation shaft directly connecting one rotation element of the first planetary gear set to one rotation element of the second planetary gear set, and selectively connected to a transmission housing; a second rotation shaft connected to another rotation element of the first planetary gear set and is directly connected to the input shaft; a third rotation shaft directly connecting the other rotation element of the first planetary gear set to one rotation element of the fourth planetary gear set; a fourth rotation shaft directly connected to another rotation element of the second planetary gear set and selectively connected to the first rotation shaft or the second rotation shaft; a fifth rotation shaft connected to the other rotation element of the second planetary gear set; a sixth rotation shaft directly connecting one rotation element of the third planetary gear set to another rotation element of the fourth planetary gear set, and selectively connected to the fourth rotation shaft; a seventh rotation shaft directly connecting another rotation element of the third planetary gear set to the other rotation element of the fourth planetary gear set, and directly connected to the output shaft; and an eighth rotation shaft connected to the other rotation element of the third planetary gear set and selectively connected to the fifth rotation shaft or to the transmission housing.

Each of the first, second, third, and fourth planetary gear sets may be a single pinion planetary gear set.

The first rotation shaft may directly connect the first sun gear to the second sun gear, the second rotation shaft may be directly connected to the first planet carrier, the third rotation shaft may directly connect the first ring gear to the fourth planet carrier, the fourth rotation shaft may be directly connected to the second planet carrier, the fifth rotation shaft may be directly connected to the second ring gear, the sixth rotation shaft may directly connect the third sun gear to the fourth sun gear, the seventh rotation shaft may directly connect the third planet carrier to the fourth ring gear, and the eighth rotation shaft may be directly connected to the third ring gear.

The planetary gear train may further include: a first clutch disposed between the second rotation shaft and the fourth rotation shaft; a second clutch disposed between the first rotation shaft and the fourth rotation shaft; a third clutch disposed between the fourth rotation shaft and the sixth rotation shaft; a fourth clutch disposed between the fifth rotation shaft and the eighth rotation shaft; a first brake disposed between the first rotation shaft and the transmission housing; and a second brake disposed between the eighth rotation shaft and the transmission housing.

The third and fourth clutches and the second brake may be operated at a first forward speed, the first and third clutches and the second brake may be operated at a second forward speed, the second and third clutches and the second brake may be operated at a third forward speed, the first and second clutches and the second brake may be operated at a fourth forward speed, the first, second, and fourth clutches may be operated at a fifth forward speed, the second and fourth clutches and the first brake may be operated at a sixth forward speed, the first and fourth clutches and the first brake may be operated at a seventh forward speed, the third and fourth clutches and the first brake may be operated at an eighth forward speed, the first and third clutches and the first brake may be operated at a ninth forward speed, the second and third clutches and the first brake may be operated at a tenth forward speed, and the first and fourth clutches and the second brake may be operated at a reverse speed.

The first, second, third, and fourth planetary gear sets may be sequentially disposed from the engine to a rear of the planetary gear train.

A planetary gear train of an automatic transmission for a vehicle according to another exemplary embodiment of the present invention may include: an input shaft configured to receive torque of an engine; an output shaft outputting changed torque; a first planetary gear set having a first sun gear, a first planet carrier, and a first ring gear as rotation elements thereof; a second planetary gear set having a second sun gear, a second planet carrier, and a second ring gear as rotation elements thereof; a third planetary gear set having a third sun gear, a third planet carrier, and a third ring gear as rotation elements thereof; a fourth planetary gear set having a fourth sun gear, a fourth planet carrier, and a fourth ring gear as rotation elements thereof; a first rotation shaft directly connecting the first sun gear to the second sun gear and selectively connected to a transmission housing; a second rotation shaft directly connected to the first planet carrier and to the input shaft; a third rotation shaft directly connecting the first ring gear to the fourth planet carrier; a fourth rotation shaft directly connected to the second planet carrier and selectively connected to the first rotation shaft or to the second rotation shaft; a fifth rotation shaft directly connected to the second ring gear; a sixth rotation shaft directly connecting the third sun gear to the fourth sun gear and selectively connected to the fourth rotation shaft; a seventh rotation shaft directly connecting the third planet carrier to the fourth ring gear and directly connected to the output shaft; and an eighth rotation shaft directly connected to the third ring gear and selectively connected to the fifth rotation shaft or to the transmission housing.

Each of the first, second, third, and fourth planetary gear sets may be a single pinion planetary gear set.

The planetary gear train may further include: a first clutch disposed between the second rotation shaft and the fourth rotation shaft; a second clutch disposed between the first rotation shaft and the fourth rotation shaft; a third clutch disposed between the fourth rotation shaft and the sixth rotation shaft; a fourth clutch disposed between the fifth rotation shaft and the eighth rotation shaft; a first brake disposed between the first rotation shaft and the transmission housing; and a second brake disposed between the eighth rotation shaft and the transmission housing.

The third and fourth clutches and the second brake may be operated at a first forward speed, the first and third clutches and the second brake may be operated at a second forward speed, the second and third clutches and the second brake may be operated at a third forward speed, the first and second clutches and the second brake may be operated at a fourth forward speed, the first, second, and fourth clutches may be operated at a fifth forward speed, the second and fourth clutches and the first brake may be operated at a sixth forward speed, the first and fourth clutches and the first brake may be operated at a seventh forward speed, the third and fourth clutches and the first brake may be operated at an eighth forward speed, the first and third clutches and the first brake may be operated at a ninth forward speed, the second and third clutches and the first brake may be operated at a tenth forward speed, and the first and fourth clutches and the second brake may be operated at a reverse speed.

The first, second, third, and fourth planetary gear sets may be sequentially disposed from the engine to a rear of the planetary gear train.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each shift-speed applied to a planetary gear train according to an exemplary embodiment of the present invention.

FIG. 3E is a lever diagram for a planetary gear train according to an exemplary embodiment of the present invention at the fifth forward speed.

Figure 1:
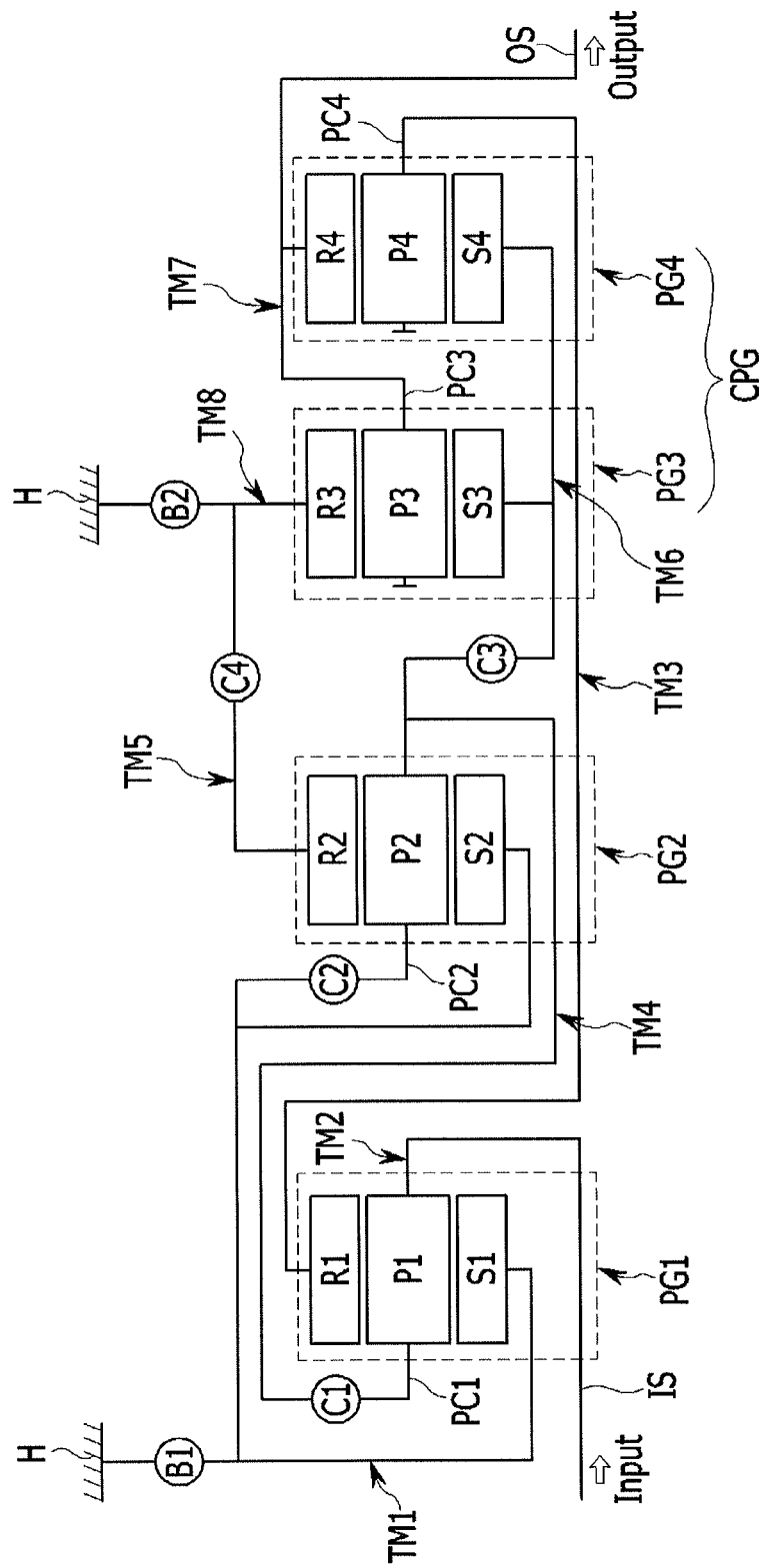
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to an exemplary embodiment of the present invention.

Referring to FIG. 1, a planetary gear train according to an exemplary embodiment of the present invention includes first, second, third and fourth planetary gear sets PG1, PG2, PG3 and PG4 disposed on the same axis, an input shaft IS, an output shaft OS, eight rotation shafts TM1-TM8 directly connecting rotation elements of the first, second, third and fourth planetary gear sets PG1, PG2, PG3 and PG4, six frictional elements C1-C4 and B1-B2, and a transmission housing H.

A torque input from the input shaft IS is changed by the first, second, third and fourth planetary gear sets PG1, PG2, PG3 and PG4, and the changed torque is output through the output shaft OS.

In addition, the planetary gear sets are disposed in a sequence of the first, second, third and fourth planetary gear sets PG1, PG2, PG3 and PG4 from a front portion close to an engine to a rear portion.

The input shaft IS is an input member, and torque from a crankshaft of the engine is changed through a torque converter and is input to the input shaft IS.

The output shaft OS is an output member and drives a driving wheel through a differential apparatus.

The first planetary gear set PG1 is a single pinion planetary gear set, and includes a first sun gear S1, a first planet carrier PC1 rotatably supporting a first pinion P1 externally meshed with the first sun gear S1, and a first ring gear R1 internally meshed with the first pinion P1 as rotation elements thereof.

The second planetary gear set PG2 is a single pinion planetary gear set, and includes a second sun gear S2, a second planet carrier PC2 rotatably supporting a second pinion P2 externally meshed with the second sun gear S2, and a second ring gear R2 internally meshed with the second pinion P2 as rotation elements thereof.

The third planetary gear set PG3 is a single pinion planetary gear set, and includes a third sun gear S3, a third planet carrier PC3 rotatably supporting a third pinion P3 externally meshed with the third sun gear S3, and a third ring gear R3 internally meshed with the third pinion P3.

The fourth planetary gear set PG4 is a single pinion planetary gear set, and includes a fourth sun gear S4, a fourth planet carrier PC4 rotatably supporting a fourth pinion P4 externally meshed with the fourth sun gear S4, and a fourth ring gear R4 internally meshed with the fourth pinion P4 as rotation elements thereof.

One rotation element of the first planetary gear set PG1 is directly connected to one rotation element of the second planetary gear set PG1 and another rotation element of the first planetary gear set PG1 is directly connected to one rotation element of the fourth planetary gear set PG4.

Two rotation elements of the third planetary gear set PG3 are directly connected to two rotation elements of the fourth planetary gear set PG4 such that the third and fourth planetary gear sets PG3 and PG4 are operated as one compound planetary gear set (CPG).

Therefore, twelve rotation elements of the first, second, third, and fourth planetary gear sets PG1, PG2, PG3, and PG4 are combined into eight rotation shafts TM1-TM8.

The first rotation shaft TM1 includes the first sun gear S1 and the second sun gear S2 that are directly connected to each other and is selectively connected to the transmission housing H.

The second rotation shaft TM2 includes the first planet carrier PC1 that is directly connected to the input shaft IS and is always operated as an input element.

The third rotation shaft TM3 includes the first ring gear R1 and the fourth planet carrier PC4 that are directly connected to each other.

The fourth rotation shaft TM4 includes the second planet carrier PC2 and is selectively connected to the second rotation shaft TM2.

The fifth rotation shaft TM5 includes the second ring gear R2.

The sixth rotation shaft TM6 includes the third sun gear S3 and the fourth sun gear S4 that are directly connected to each other, and is selectively connected to the fourth rotation shaft TM4.

The seventh rotation shaft TM7 includes the third planet carrier PC3 and the fourth ring gear R4 that are directly connected to each other, and is directly connected to the output shaft OS so as to be always operated as an output element.

The eighth rotation shaft TM8 includes the third ring gear R3 and is selectively connected to the fifth rotation shaft TM3 or to the transmission housing H.

Four clutches C1, C2, C3, and C4 are disposed between selected rotation shafts.

In addition, two brakes B1 and B2 are disposed between selected rotation shafts and the transmission housing H.

The first clutch C1 is interposed between the second rotation shaft TM2 and the fourth rotation shaft TM4 and selectively connects the second and fourth rotation shafts TM2 and TM4.

The second clutch C2 is interposed between the first rotation shaft TM1 and the fourth rotation shaft TM4 and selectively connects the first and fourth rotation shafts TM1 and TM4.

The third clutch C3 is interposed between the fourth rotation shaft TM4 and the sixth rotation shaft TM6 and selectively connects the third and sixth rotation shafts TM3 and TM6.

The fourth clutch C4 is interposed between the fifth rotation shaft TM5 and the eighth rotation shaft TM8 and selectively connects the fifth and eighth rotation shafts TM5 and TM8.

The first brake B1 is interposed between the first rotation shaft TM1 and the transmission housing H and selectively stops the first rotation shaft TM1.

The second brake B2 is interposed between the eighth rotation shaft TM8 and the transmission housing H and selectively stops the eighth rotation shaft TM8.

The friction elements including first, second, third, and fourth clutches C1, C2, C3, and C4 and the first and second brakes B1 and B2 are conventional multi-plate friction members of wet type that are operated by hydraulic pressure.

FIG. 2 is an operational chart of friction elements at each shift-speed applied to a planetary gear train according to an exemplary embodiment of the present invention.

As shown in FIG. 2, three frictional elements are operated at each speed in the planetary gear train according to the exemplary embodiment of the present invention.

The third and fourth clutches C3 and C4 and the second brake B2 are operated at a first forward speed $1^{ST}$.

The first and third clutches C1 and C3 and the second brake B2 are operated at a second forward speed $2^{ND}$.

The second and third clutches C2 and C3 and the second brake B2 are operated at a third forward speed $3^{RD}$.

The first and second clutches C1 and C2 and the second brake B2 are operated at a fourth forward speed $4^{TH}$.

The first, second, and fourth clutches C1, C2, and C4 are operated at a fifth forward speed $5^{TH}$.

The second and fourth clutches C2 and C4 and the first brake B1 are operated at a sixth forward speed $6^{TH}$.

The first and fourth clutches C1 and C4 and the first brake B1 are operated at a seventh forward speed $7^{TH}$.

The third and fourth clutches C3 and C4 and the first brake B1 are operated at an eighth forward speed $8^{TH}$.

The first and third clutches C1 and C3 and the first brake B1 are operated at a ninth forward speed $9^{TH}$.

The second and third clutches C2 and C3 and the first brake B1 are operated at a tenth forward speed $10^{TH}$.

The first and fourth clutches C1 and C4 and the second brake B2 are operated at a reverse speed Rev.

FIG. 3A to FIG. 3K are lever diagrams for a planetary gear train according to an exemplary embodiment of the present invention, and illustrates shift processes of the planetary gear train according to the exemplary embodiment of the present invention by lever analysis method.

Referring to FIG. 3A to FIG. 3K, three vertical lines corresponding to the first planetary gear set PG1 are set as the first rotation shaft TM1, the second rotation shaft TM2, and the third rotation shaft TM3, three vertical lines corresponding to the second planetary gear set PG2 are set as the first rotation shaft TM1, the fourth rotation shaft TM4, and the fifth rotation shaft TM5, and four vertical lines corresponding to the compound planetary gear set CPG are set as the sixth rotation shaft TM6, the third rotation shaft TM3, the seventh rotation shaft TM7, and the eighth rotation shaft TM8 from the left to the right in the drawing.

In addition, a middle horizontal line represents a rotation speed of "0", an upper horizontal line represents a rotation speed of "1", and a lower horizontal line represents a rotation speed of "−1". Here, the "−" means an inverse rotation speed.

In addition, the rotation speed of "1" is the same as that of the input shaft IS.

Distances among the vertical lines of the first and second planetary gear sets PG1 and PG2 and the compound planetary gear set CPG are set according to gear ratios (teeth number of sun gear/teeth number of ring gear) of the first and second planetary gear sets PG1 and PG2 and the compound planetary gear set CPG.

Since setting the rotation shafts is well known to a person of an ordinary skill in the art, detailed description thereof will be omitted.

Hereinafter, referring to FIG. 2 and FIG. 3A to FIG. 3K, each speed of the planetary gear train according to the exemplary embodiment of the present invention will be described in detail.

[First Forward Speed]

Referring to FIG. 2, the third clutch C3, the fourth clutch C4, and the second brake B2 are operated at the first forward speed $1^{ST}$.

Figure 3A:
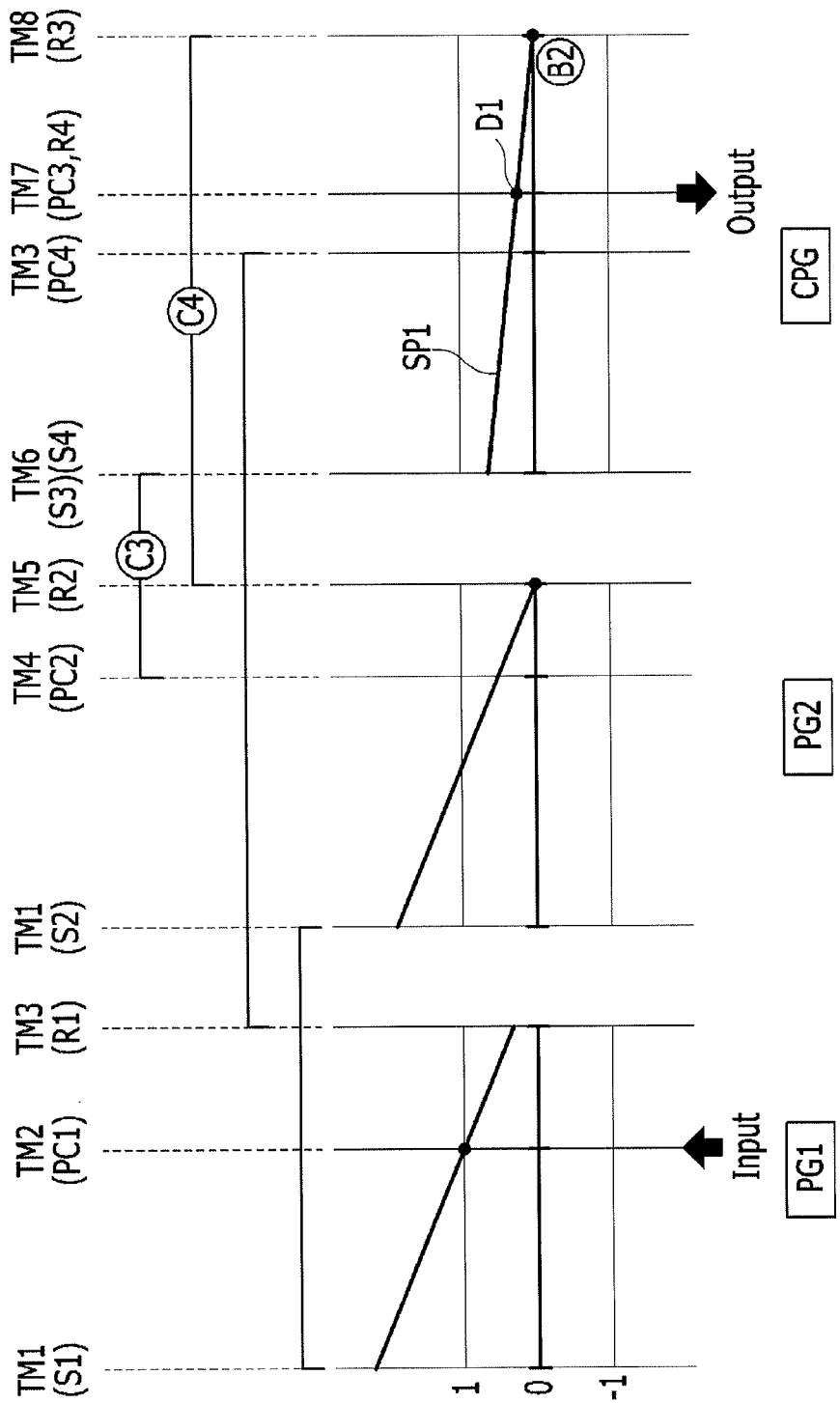
FIG. 3A is a lever diagram for a planetary gear train according to an exemplary embodiment of the present invention at the first forward speed.

As shown in FIG. 3A, in a state that the rotation speed of the input shaft IS is input to the second rotation shaft TM2, the fourth rotation shaft TM4 and the sixth rotation shaft TM6 are connected by operation of the third clutch C3, the fifth rotation shaft TM5 and the eighth rotation shaft TM8 are connected by operation of the fourth clutch C4, and the eighth rotation shaft TM8 is operated as a fixed element by operation of the second brake B2.

Therefore, the rotation shafts of the compound planetary gear set CPG form a first shift line SP1 by cooperation of the compound planetary gear set CPG and the first and second planetary gear sets PG1 and PG2, and D1 is output through the seventh rotation shaft TM7 that is the output element.

[Second Forward Speed]

The fourth clutch C4 that was operated at the first forward speed $1^{ST}$ is released and the first clutch C1 is operated at the second forward speed $2^{ND}$.

Figure 3B:
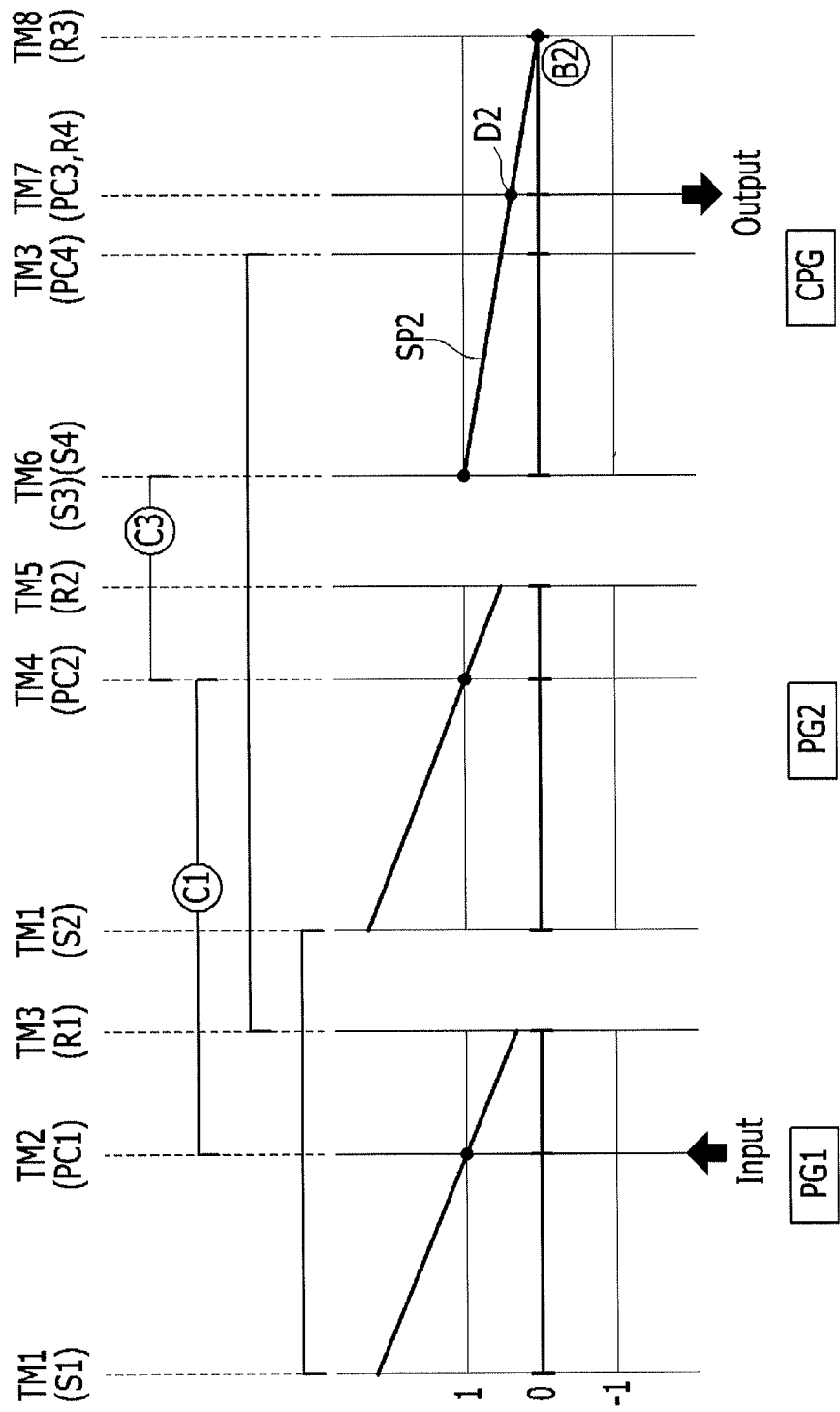
FIG. 3B is a lever diagram for a planetary gear train according to an exemplary embodiment of the present invention at the second forward speed.

As shown in FIG. 3B, in a state that the rotation speed of the input shaft IS is input to the second rotation shaft TM2, the second rotation shaft TM2 and the fourth rotation shaft TM4 are connected by operation of the first clutch C1, the fourth rotation shaft TM4 and the sixth rotation shaft TM6 are connected by operation of the third clutch C3, and the eighth rotation shaft TM8 is operated as the fixed element by operation of the second brake B2.

Therefore, the rotation shafts of the compound planetary gear set CPG form a second shift line SP2 by cooperation of the compound planetary gear set CPG and the first and second planetary gear sets PG1 and PG2, and D2 is output through the seventh rotation shaft TM7 that is the output element.

[Third Forward Speed]

The first clutch C1 that was operated at the second forward speed $2^{ND}$ is released and the second clutch C2 is operated at the third forward speed $3^{RD}$.

Figure 3C:
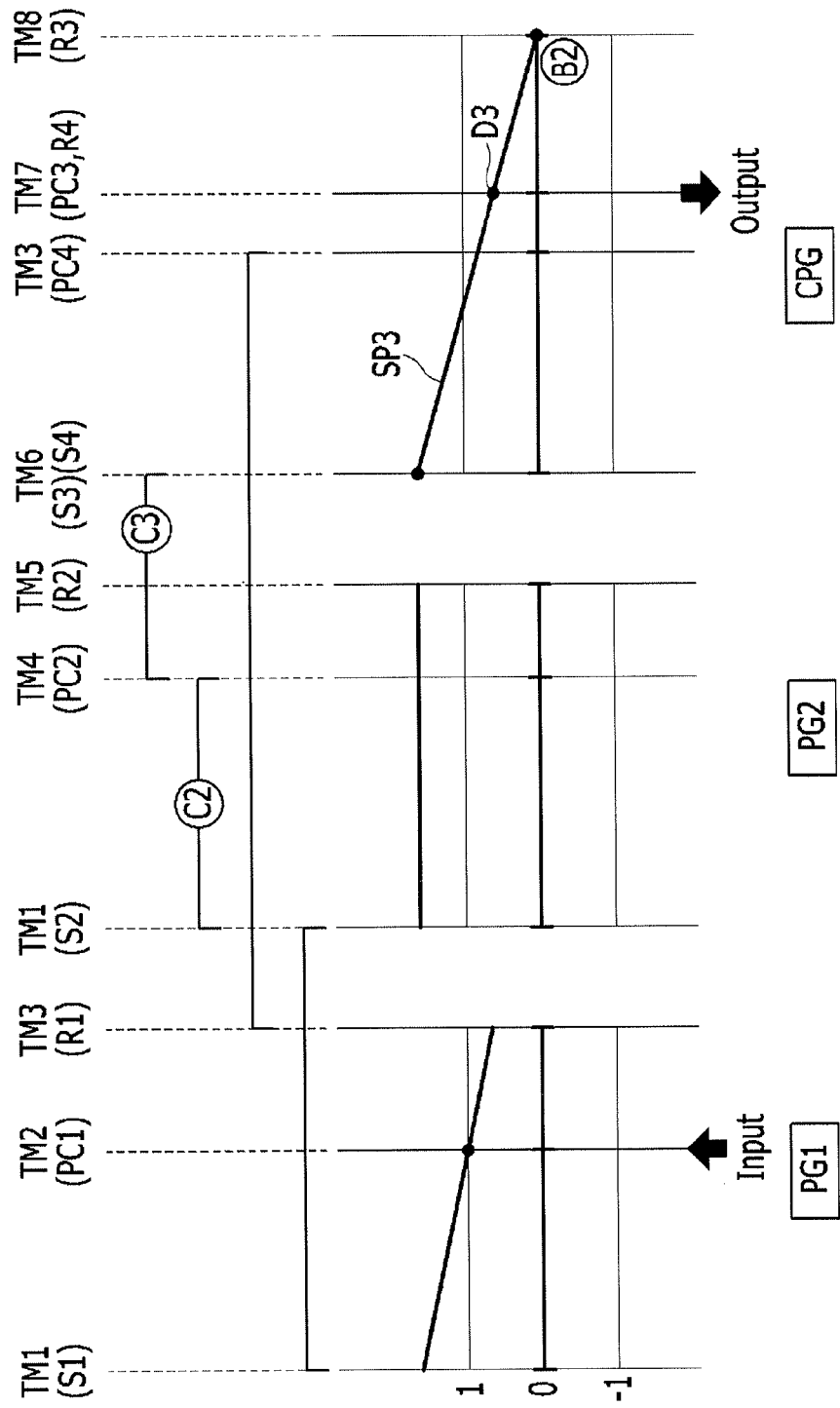
FIG. 3C is a lever diagram for a planetary gear train according to an exemplary embodiment of the present invention at the third forward speed.

As shown in FIG. 3C, in a state that the rotation speed of the input shaft IS is input to the second rotation shaft TM2, the first rotation shaft TM1 and the fourth rotation shaft TM4 are connected by operation of the second clutch C2, the fourth rotation shaft TM4 and the sixth rotation shaft TM6 are connected by operation of the third clutch C3, and the eighth rotation shaft TM8 is operated as the fixed element by operation of the second brake B2.

Therefore, the rotation shafts of the compound planetary gear set CPG form a third shift line SP3 by cooperation of the compound planetary gear set CPG and the first and second planetary gear sets PG1 and PG2, and D3 is output through the seventh rotation shaft TM7 that is the output element.

[Fourth Forward Speed]

The third clutch C3 that was operated at the third forward speed $3^{RD}$ is released and the first clutch C1 is operated at the fourth forward speed $4^{TH}$.

Figure 3D:
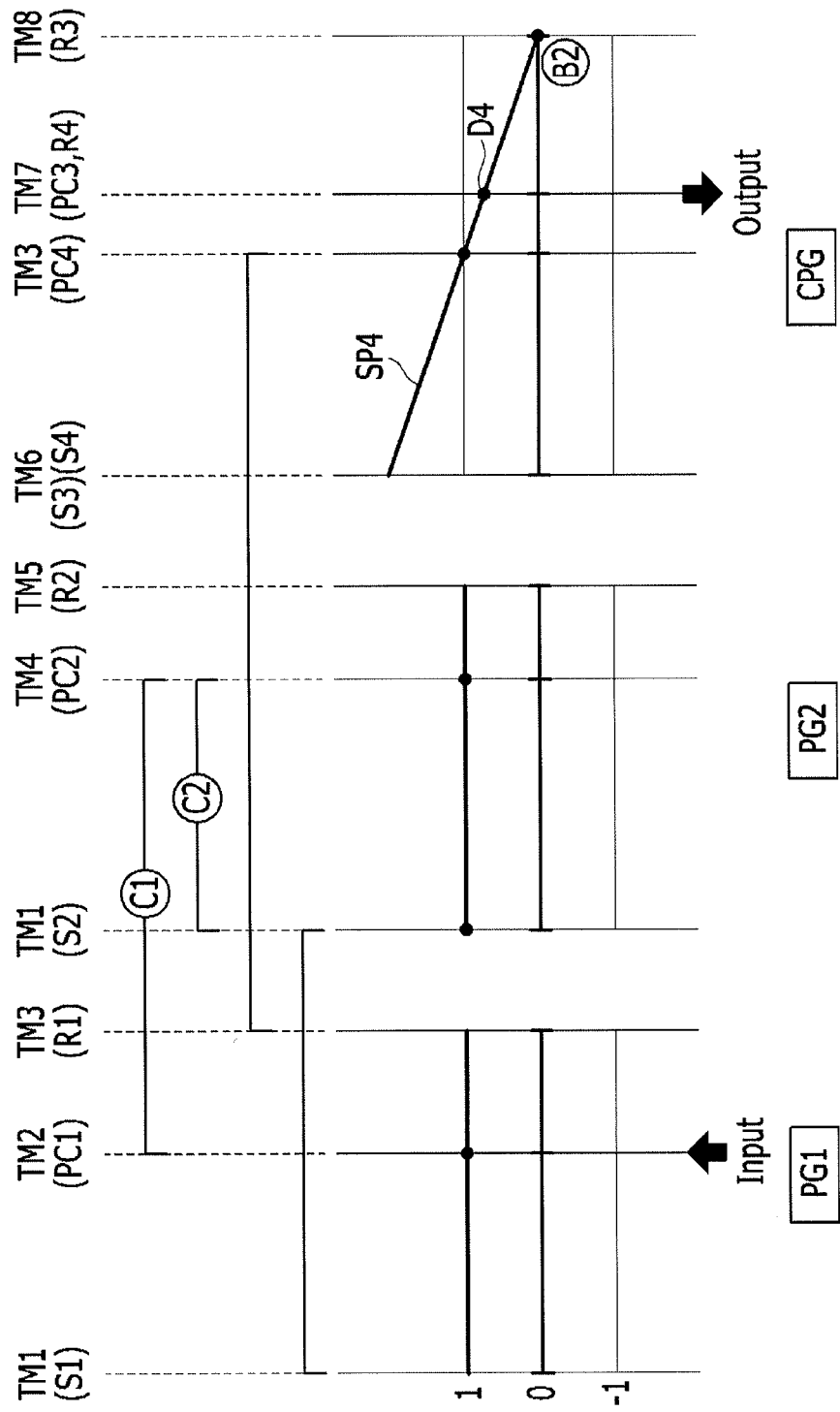
FIG. 3D is a lever diagram for a planetary gear train according to an exemplary embodiment of the present invention at the fourth forward speed.

As shown in FIG. 3D, in a state that the rotation speed of the input shaft IS is input to the second rotation shaft TM2, the second rotation shaft TM2 and the fourth rotation shaft TM4 are connected by operation of the first clutch C1, the first rotation shaft TM1 and the fourth rotation shaft TM4 are connected by operation of the second clutch C2, and the eighth rotation shaft TM8 is operated as the fixed element by operation of the second brake B2.

Therefore, the rotation shafts of the compound planetary gear set CPG form a fourth shift line SP4 by cooperation of the compound planetary gear set CPG and the first and second planetary gear sets PG1 and PG2, and D4 is output through the seventh rotation shaft TM7 that is the output element.

[Fifth Forward Speed]

The second brake B2 that was operated at the fourth forward speed $4^{TH}$ is released and the fourth clutch C4 is operated at the fifth forward speed $5^{TH}$.

As shown in FIG. 3E, in a state that the rotation speed of the input shaft IS is input to the second rotation shaft TM2, the second rotation shaft TM2 and the fourth rotation shaft TM4 are connected by operation of the first clutch C1, the first rotation shaft TM1 and the fourth rotation shaft TM4 are connected by operation of the second clutch C2, and the fifth rotation shaft TM5 and the eighth rotation shaft TM8 are connected by operation of the fourth clutch C4.

Therefore, the first and second planetary gear sets PG1 and PG2 and the compound planetary gear set CPG become direct-coupling states, the rotation shafts of the compound planetary gear set CPG form a fifth shift line SP5, and D5 is output through the seventh rotation shaft TM7 that is the output element.

[Sixth Forward Speed]

The first clutch C1 that was operated at the fifth forward speed $5^{TH}$ is released and the first brake B1 is operated at the sixth forward speed $6^{TH}$.

Figure 3F:
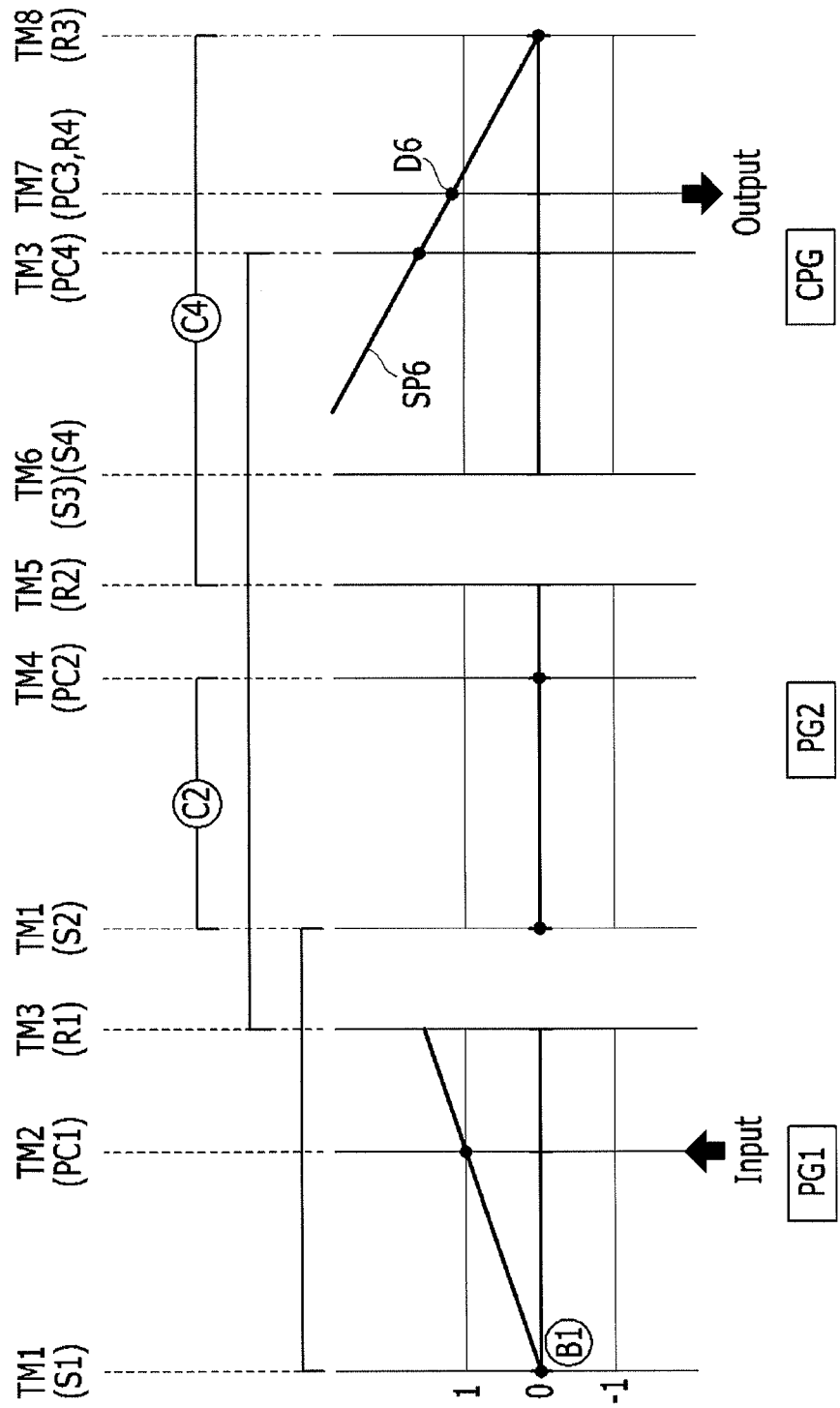
FIG. 3F is a lever diagram for a planetary gear train according to an exemplary embodiment of the present invention at the sixth forward speed.

As shown in FIG. 3F, in a state that the rotation speed of the input shaft IS is input to the second rotation shaft TM2, the first rotation shaft TM1 and the fourth rotation shaft TM4 are connected by operation of the second clutch C2, the fifth rotation shaft TM5 and the eighth rotation shaft TM8 are connected by operation of the fourth clutch C4, and the first rotation shaft TM1 is operated as the fixed element by operation of the first brake B1.

Therefore, the rotation shafts of the compound planetary gear set CPG form a sixth shift line SP6 by cooperation of the compound planetary gear set CPG and the first and second planetary gear sets PG1 and PG2, and D6 is output through the seventh rotation shaft TM7 that is the output element.

[Seventh Forward Speed]

The second clutch C2 that was operated at the sixth forward speed $6^{TH}$ is released and the first clutch C1 is operated at the seventh forward speed $7^{TH}$.

Figure 3G:
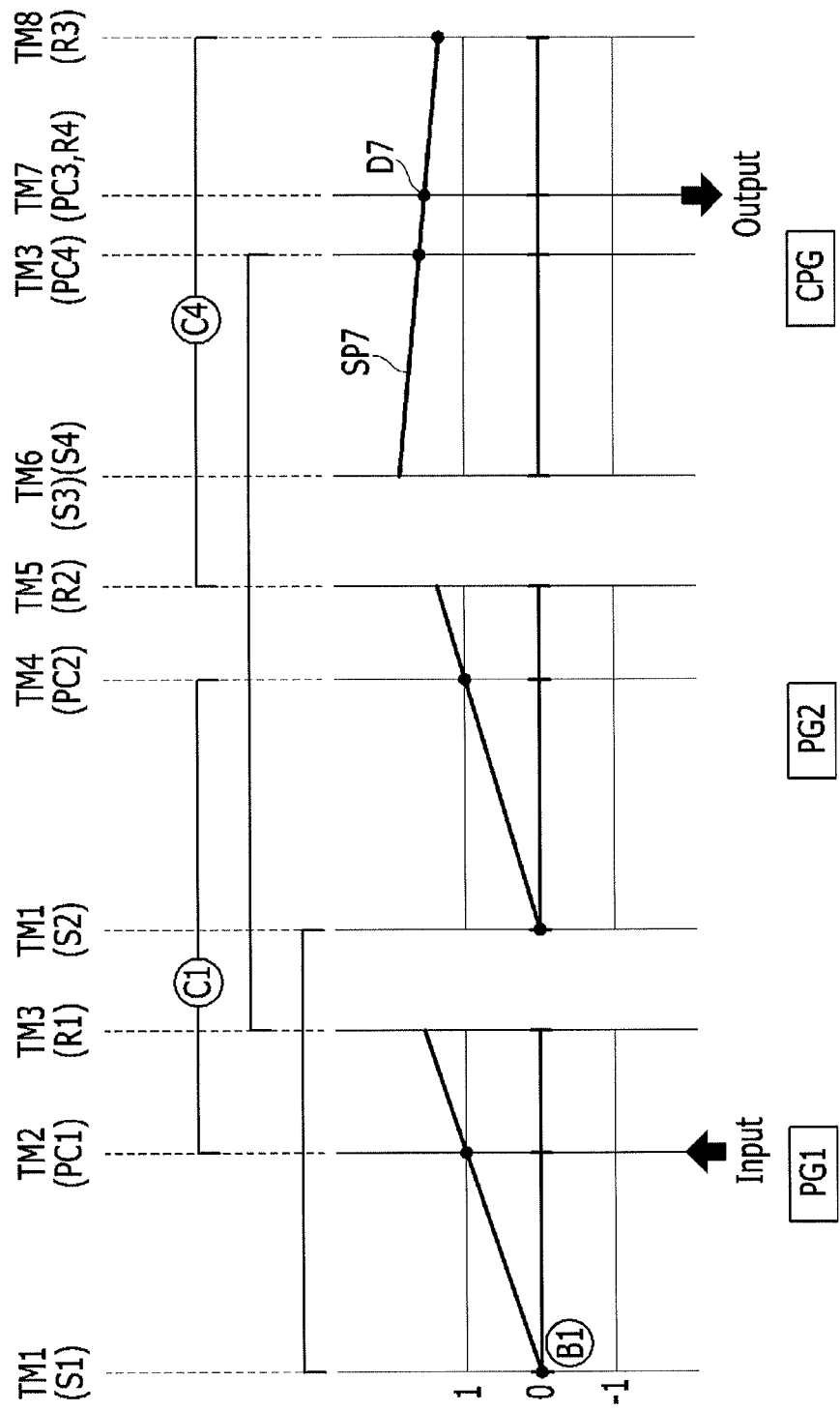
FIG. 3G is a lever diagram for a planetary gear train according to an exemplary embodiment of the present invention at the seventh forward speed.

As shown in FIG. 3G, in a state that the rotation speed of the input shaft IS is input to the second rotation shaft TM2, the second rotation shaft TM2 and the fourth rotation shaft TM4 are connected by operation of the first clutch C1, the fifth rotation shaft TM5 and the eighth rotation shaft TM8 are connected by operation of the fourth clutch C4, and the first rotation shaft TM1 is operated as the fixed element by operation of the first brake B1.

Therefore, the rotation shafts of the compound planetary gear set CPG form a seventh shift line SP7 by cooperation of the compound planetary gear set CPG and the first and second planetary gear sets PG1 and PG2, and D7 is output through the seventh rotation shaft TM7 that is the output element.

[Eighth Forward Speed]

The first clutch C1 that was operated at the seventh forward speed $7^{TH}$ is released and the third clutch C3 is operated at the eighth forward speed $8^{TH}$.

Figure 3H:
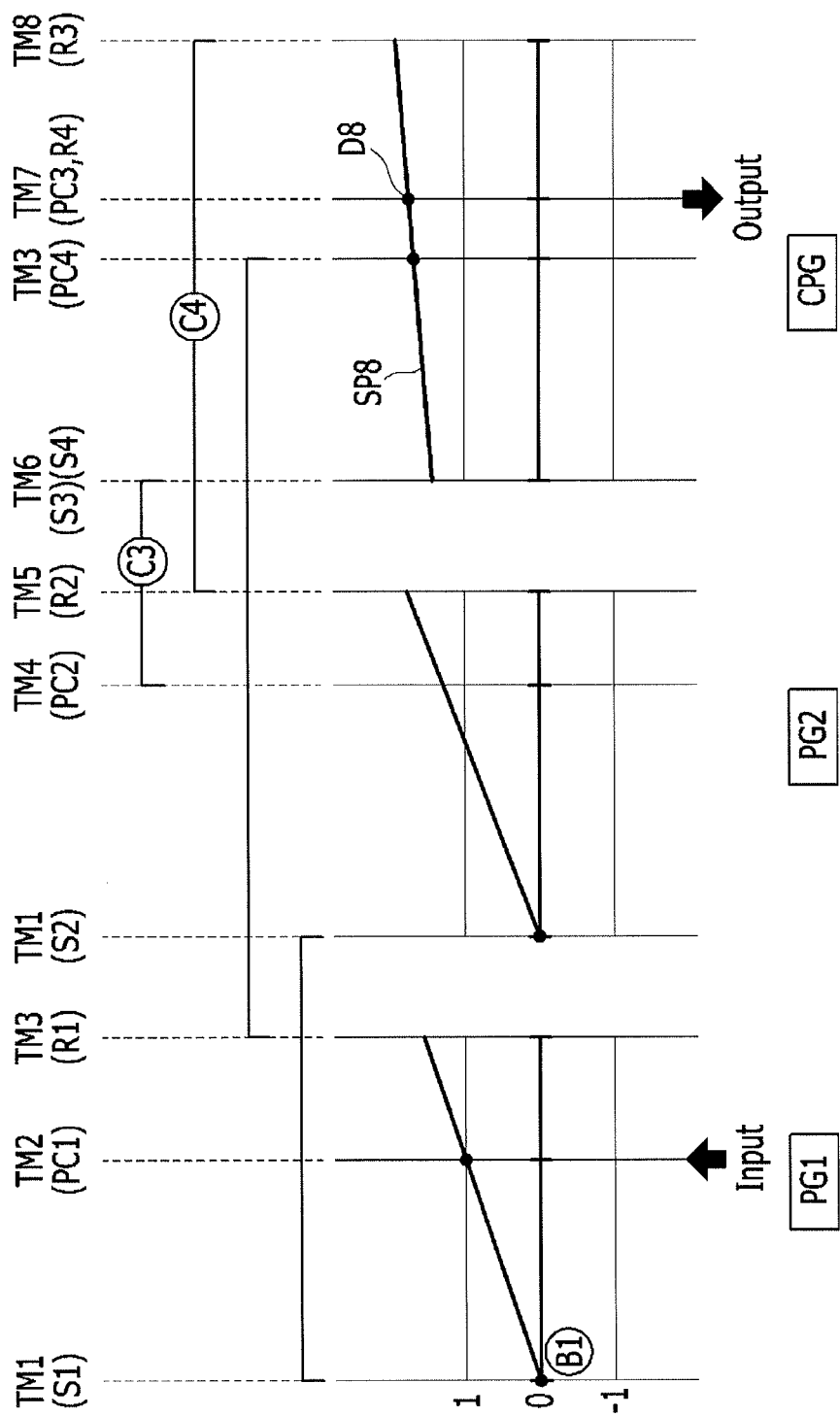
FIG. 3H is a lever diagram for a planetary gear train according to an exemplary embodiment of the present invention at the eighth forward speed.

As shown in FIG. 3H, in a state that the rotation speed of the input shaft IS is input to the second rotation shaft TM2, the fourth rotation shaft TM4 and the sixth rotation shaft TM6 are connected by operation of the third clutch C3, the fifth rotation shaft TM5 and the eighth rotation shaft TM8 are connected by operation of the fourth clutch C4, and the first rotation shaft TM1 is operated as the fixed element by operation of the first brake B1.

Therefore, the rotation shafts of the compound planetary gear set CPG form an eighth shift line SP8 by cooperation of the compound planetary gear set CPG and the first and second planetary gear sets PG1 and PG2, and D8 is output through the seventh rotation shaft TM7 that is the output element.

[Ninth Forward Speed]

The fourth clutch C4 that was operated at the eighth forward speed $8^{TH}$ is released and the first clutch C1 is operated at the ninth forward speed $9^{TH}$.

Figure 3I:
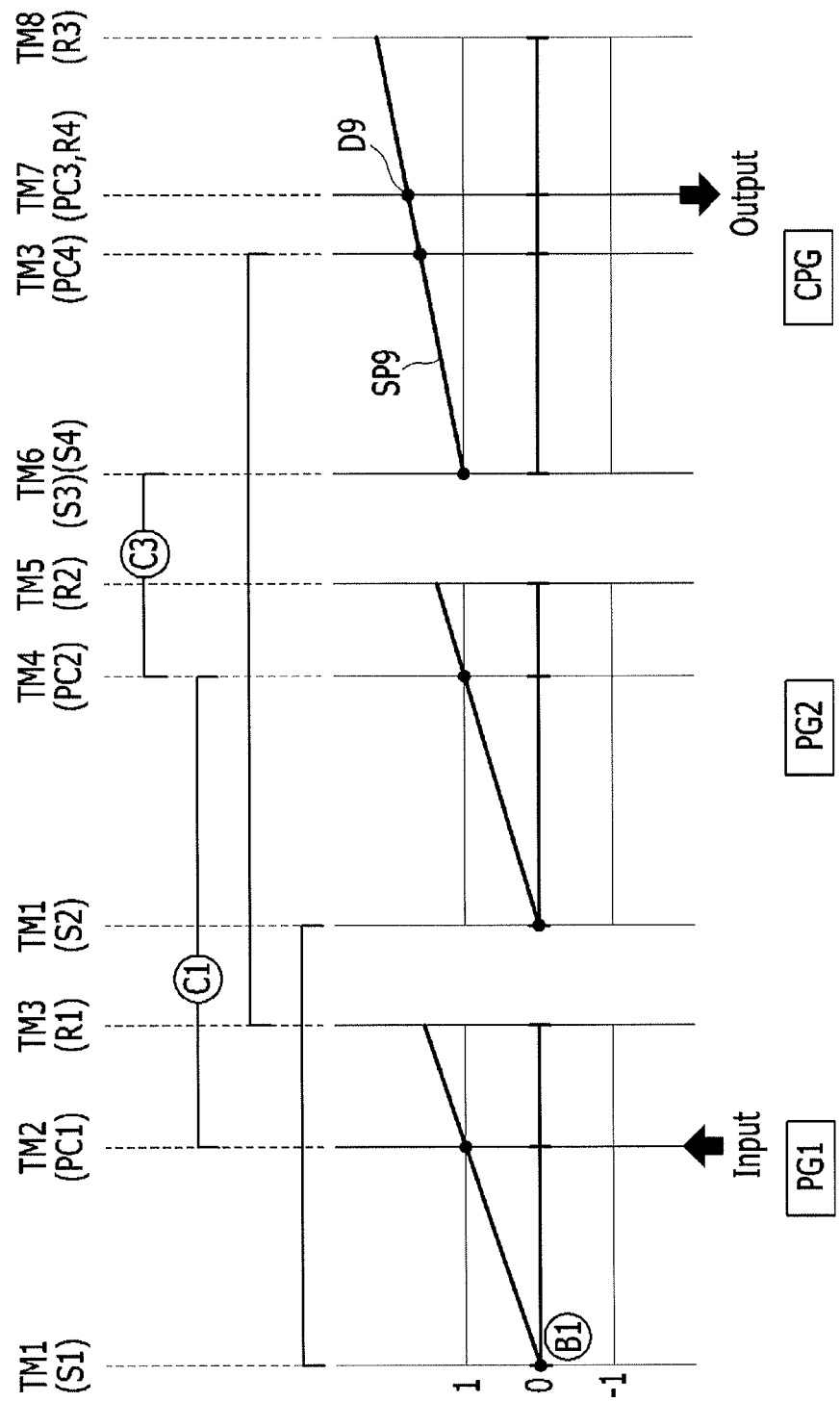
FIG. 3I is a lever diagram for a planetary gear train according to an exemplary embodiment of the present invention at the ninth forward speed.

As shown in FIG. 3I, in a state that the rotation speed of the input shaft IS is input to the second rotation shaft TM2, the second rotation shaft TM2 and the fourth rotation shaft TM4 are connected by operation of the first clutch C1, the fourth rotation shaft TM4 and the sixth rotation shaft TM6 are connected by operation of the third clutch C3, and the first rotation shaft TM1 is operated as the fixed element by operation of the first brake B1.

Therefore, the rotation shafts of the compound planetary gear set CPG form a ninth shift line SP9 by cooperation of the compound planetary gear set CPG and the first and second planetary gear sets PG1 and PG2, and D9 is output through the seventh rotation shaft TM7 that is the output element.

[Tenth Forward Speed]

The first clutch C1 that was operated at the ninth forward speed $9^{TH}$ is released and the second clutch C2 is operated at the tenth forward speed $10^{TH}$.

Figure 3J:
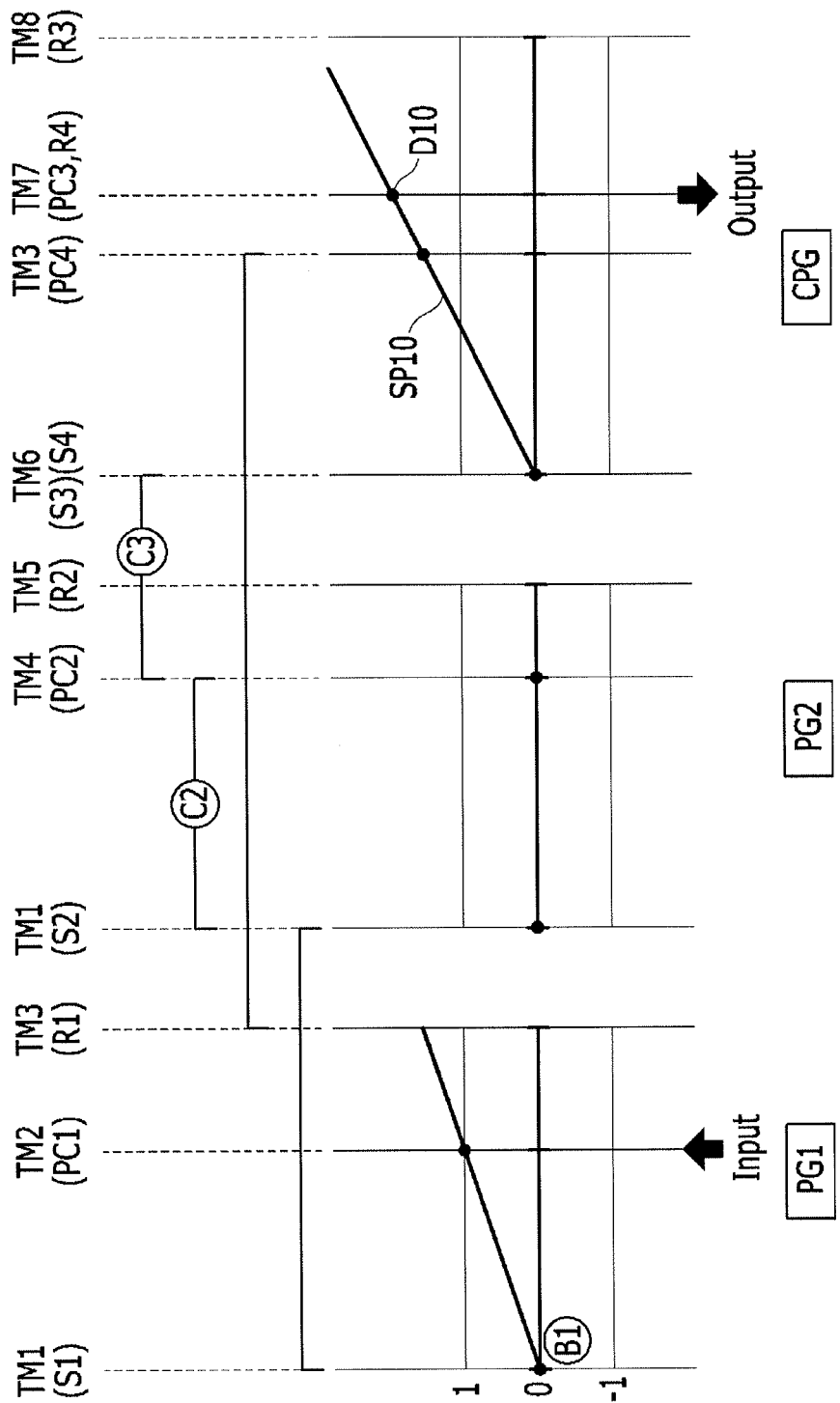
FIG. 3J is a lever diagram for a planetary gear train according to an exemplary embodiment of the present invention at the tenth forward speed.

As shown in FIG. 3J, in a state that the rotation speed of the input shaft IS is input to the second rotation shaft TM2, the first rotation shaft TM1 and the fourth rotation shaft TM4 are connected by operation of the second clutch C2, the fourth rotation shaft TM4 and the sixth rotation shaft TM6 are connected by operation of the third clutch C3, and the first rotation shaft TM1 is operated as the fixed element by operation of the first brake B1.

Therefore, the rotation shafts of the compound planetary gear set CPG form a tenth shift line SP10 by cooperation of the compound planetary gear set CPG and the first and second planetary gear sets PG1 and PG2, and D10 is output through the seventh rotation shaft TM7 that is the output element.

[Reverse Speed]

The first clutch C1, the fourth clutch C4, and the second brake B2 are operated at the reverse speed Rev.

Figure 3K:
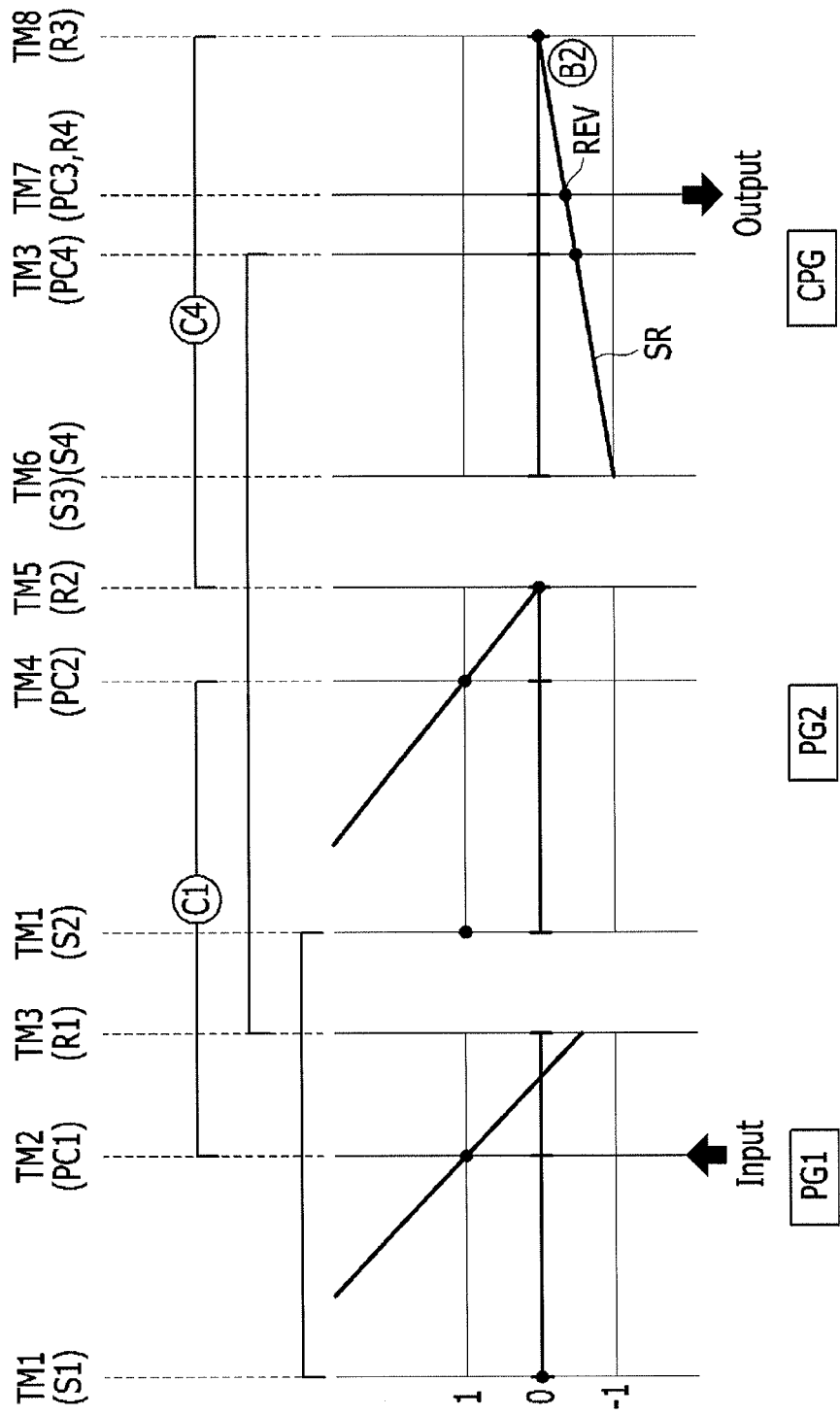
FIG. 3K is a lever diagram for a planetary gear train according to an exemplary embodiment of the present invention at the reverse speed.

As shown in FIG. 3K, in a state that the rotation speed of the input shaft IS is input to the second rotation shaft TM2, the second rotation shaft TM2 and the fourth rotation shaft TM4 are connected by operation of the first clutch C1, the fifth rotation shaft TM5 and the eighth rotation shaft TM8 are connected by operation of the fourth clutch C4, and the eighth rotation shaft TM8 is operated as the fixed element by operation of the second brake B2.

Therefore, the rotation shafts of the compound planetary gear set CPG form a reverse shift line RS by cooperation of the compound planetary gear set CPG and the first and second planetary gear sets PG1 and PG2, and REV is output through the seventh rotation shaft TM7 that is the output element.

According to the exemplary embodiment of the present invention, ten forward speeds and one reverse speed may be achieved by controlling operation of the four planetary gear sets PG1, PG2, PG3, and PG4 through the four clutches C1, C2, C3, and C4 and two brakes B1 and B2.

The planetary gear train according to the exemplary embodiment of the present invention may improve power delivery efficiency and fuel economy by achieving multiple-speeds of the automatic transmission.

Since at least three friction elements are operated at each speed, the number of the friction elements that are not operated can be reduced. Therefore, drag loss may be reduced and power delivery efficiency and fuel economy may be further improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft configured to receive torque of an engine;
   an output shaft outputting changed torque;
   a first planetary gear set having a first sun gear, a first planet carrier, and a first ring gear as rotation elements thereof;
   a second planetary gear set having a second sun gear, a second planet carrier, and a second ring gear as rotation elements thereof;
   a third planetary gear set having a third sun gear, a third planet carrier, and a third ring gear as rotation elements thereof;
   a fourth planetary gear set having a fourth sun gear, a fourth planet carrier, and a fourth ring gear as rotation elements thereof;
   a first rotation shaft directly connecting one rotation element of the first planetary gear set to one rotation element of the second planetary gear set, and selectively connected to a transmission housing;
   a second rotation shaft connected to another rotation element of the first planetary gear set and is directly connected to the input shaft;
   a third rotation shaft directly connecting the other rotation element of the first planetary gear set to one rotation element of the fourth planetary gear set;
   a fourth rotation shaft directly connected to another rotation element of the second planetary gear set and selectively connected to the first rotation shaft or the second rotation shaft;
   a fifth rotation shaft connected to the other rotation element of the second planetary gear set;
   a sixth rotation shaft directly connecting one rotation element of the third planetary gear set to another rotation element of the fourth planetary gear set, and selectively connected to the fourth rotation shaft;
   a seventh rotation shaft directly connecting another rotation element of the third planetary gear set to the other rotation element of the fourth planetary gear set, and directly connected to the output shaft; and
   an eighth rotation shaft connected to the other rotation element of the third planetary gear set and selectively connected to the fifth rotation shaft or to the transmission housing.

2. The planetary gear train of claim 1, wherein each of the first, second, third, and fourth planetary gear sets is a single pinion planetary gear set.

3. The planetary gear train of claim 1,
   wherein the first rotation shaft directly connects the first sun gear to the second sun gear,
   wherein the second rotation shaft is directly connected to the first planet carrier,
   wherein the third rotation shaft directly connects the first ring gear to the fourth planet carrier,
   wherein the fourth rotation shaft is directly connected to the second planet carrier,
   wherein the fifth rotation shaft is directly connected to the second ring gear,
   wherein the sixth rotation shaft directly connects the third sun gear to the fourth sun gear,
   wherein the seventh rotation shaft directly connects the third planet carrier to the fourth ring gear, and
   wherein the eighth rotation shaft is directly connected to the third ring gear.

4. The planetary gear train of claim 1, further comprising:
   a first clutch disposed between the second rotation shaft and the fourth rotation shaft;
   a second clutch disposed between the first rotation shaft and the fourth rotation shaft;
   a third clutch disposed between the fourth rotation shaft and the sixth rotation shaft;
   a fourth clutch disposed between the fifth rotation shaft and the eighth rotation shaft;
   a first brake disposed between the first rotation shaft and the transmission housing; and
   a second brake disposed between the eighth rotation shaft and the transmission housing.

5. The planetary gear train of claim 4,
   wherein the third and fourth clutches and the second brake are operated at a first forward speed,
   wherein the first and third clutches and the second brake are operated at a second forward speed,
   wherein the second and third clutches and the second brake are operated at a third forward speed,
   wherein the first and second clutches and the second brake are operated at a fourth forward speed,
   wherein the first, second, and fourth clutches are operated at a fifth forward speed,
   wherein the second and fourth clutches and the first brake are operated at a sixth forward speed,
   wherein the first and fourth clutches and the first brake are operated at a seventh forward speed,
   wherein the third and fourth clutches and the first brake are operated at an eighth forward speed,
   wherein the first and third clutches and the first brake are operated at a ninth forward speed,
   wherein the second and third clutches and the first brake are operated at a tenth forward speed, and
   wherein the first and fourth clutches and the second brake are operated at a reverse speed.

6. The planetary gear train of claim 1, wherein the first, second, third, and fourth planetary gear sets are sequentially disposed from the engine to a rear of the planetary gear train.

7. A planetary gear train of an automatic transmission for a vehicle comprising:
   an input shaft configured to receive torque of an engine;
   an output shaft outputting changed torque;
   a first planetary gear set having a first sun gear, a first planet carrier, and a first ring gear as rotation elements thereof;
   a second planetary gear set having a second sun gear, a second planet carrier, and a second ring gear as rotation elements thereof;
   a third planetary gear set having a third sun gear, a third planet carrier, and a third ring gear as rotation elements thereof;
   a fourth planetary gear set having a fourth sun gear, a fourth planet carrier, and a fourth ring gear as rotation elements thereof;
   a first rotation shaft directly connecting the first sun gear to the second sun gear and selectively connected to a transmission housing;
   a second rotation shaft directly connected to the first planet carrier and to the input shaft;
   a third rotation shaft directly connecting the first ring gear to the fourth planet carrier;
   a fourth rotation shaft directly connected to the second planet carrier and selectively connected to the first rotation shaft or to the second rotation shaft;

a fifth rotation shaft directly connected to the second ring gear;

a sixth rotation shaft directly connecting the third sun gear to the fourth sun gear and selectively connected to the fourth rotation shaft;

a seventh rotation shaft directly connecting the third planet carrier to the fourth ring gear and directly connected to the output shaft; and an eighth rotation shaft directly connected to the third ring gear and selectively connected to the fifth rotation shaft or to the transmission housing.

8. The planetary gear train of claim 7, wherein each of the first, second, third, and fourth planetary gear sets is a single pinion planetary gear set.

9. The planetary gear train of claim 7, further comprising:

a first clutch disposed between the second rotation shaft and the fourth rotation shaft;

a second clutch disposed between the first rotation shaft and the fourth rotation shaft;

a third clutch disposed between the fourth rotation shaft and the sixth rotation shaft;

a fourth clutch disposed between the fifth rotation shaft and the eighth rotation shaft;

a first brake disposed between the first rotation shaft and the transmission housing; and a second brake disposed between the eighth rotation shaft and the transmission housing.

10. The planetary gear train of claim 9, wherein the third and fourth clutches and the second brake are operated at a first forward speed, wherein the first and third clutches and the second brake are operated at a second forward speed, wherein the second and third clutches and the second brake are operated at a third forward speed, wherein the first and second clutches and the second brake are operated at a fourth forward speed, wherein the first, second, and fourth clutches are operated at a fifth forward speed, wherein the second and fourth clutches and the first brake are operated at a sixth forward speed, wherein the first and fourth clutches and the first brake are operated at a seventh forward speed, wherein the third and fourth clutches and the first brake are operated at an eighth forward speed, wherein the first and third clutches and the first brake are operated at a ninth forward speed, wherein the second and third clutches and the first brake are operated at a tenth forward speed, and wherein the first and fourth clutches and the second brake are operated at a reverse speed.

11. The planetary gear train of claim 7, wherein the first, second, third, and fourth planetary gear sets are sequentially disposed from the engine to a rear of the planetary gear train.

* * * * *